US011693144B2

(12) United States Patent
Dai et al.

(10) Patent No.: US 11,693,144 B2
(45) Date of Patent: Jul. 4, 2023

(54) DOWNHOLE TUBULAR INSPECTION COMBINING PARTIAL SATURATION AND REMOTE FIELD EDDY CURRENTS

(71) Applicant: Halliburton Energy Services, Inc., Houston, TX (US)

(72) Inventors: Junwen Dai, The Woodlands, TX (US); Ahmed E. Fouda, Spring, TX (US); Freeman Lee Hill, III, Spring, TX (US); Christopher Michael Jones, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/665,208

(22) Filed: Feb. 4, 2022

(65) Prior Publication Data

US 2022/0390641 A1   Dec. 8, 2022

Related U.S. Application Data

(60) Provisional application No. 63/208,053, filed on Jun. 8, 2021.

(51) Int. Cl.
| | | |
|---|---|---|
| *G01V 3/10* | (2006.01) | |
| *E21B 47/00* | (2012.01) | |
| *E21B 47/085* | (2012.01) | |
| *E21B 47/0228* | (2012.01) | |
| *E21B 47/007* | (2012.01) | |
| *E21B 17/10* | (2006.01) | |

(52) U.S. Cl.
CPC .............. *G01V 3/10* (2013.01); *E21B 47/006* (2020.05); *E21B 47/007* (2020.05); *E21B 47/0228* (2020.05); *E21B 47/085* (2020.05); *E21B 17/1078* (2013.01)

(58) Field of Classification Search
None
See application file for complete search history.

(56) References Cited

U.S. PATENT DOCUMENTS

| | | |
|---|---|---|
| 3,940,689 A | 2/1976 | Johnson, Jr. |
| 4,292,589 A | 9/1981 | Bonner |
| 9,030,196 B2 | 5/2015 | Boenisch |
| 10,031,107 B2 | 7/2018 | Boenisch |
| 10,961,841 B2 | 3/2021 | Amineh et al. |
| 2001/0038287 A1 * | 11/2001 | Amini .................... G01V 3/28 324/341 |

(Continued)

OTHER PUBLICATIONS

International Search Report and Written Opinion for Application No. PCT/US2022/016777, dated May 24, 2022.

(Continued)

*Primary Examiner* — Patrick Assouad
*Assistant Examiner* — Haidong Zhang
(74) *Attorney, Agent, or Firm* — John Wustenberg; C. Tumey Law Group PLLC (57) ABSTRACT

A system may include an electromagnetic (EM) logging tool for inspecting downhole tubulars. The EM logging tool may include a mandrel, at least one low-frequency transmitter coil disposed on the mandrel, at least one-low frequency receiver coil disposed on the mandrel, and at least one-high frequency sensor configured to measure one or more electromagnetic properties of a tubular.

20 Claims, 4 Drawing Sheets

(56) References Cited

U.S. PATENT DOCUMENTS

| | | | |
|---|---|---|---|
| 2009/0166035 A1* | 7/2009 | Almaguer | E21B 43/11 166/255.2 |
| 2016/0169794 A1 | 6/2016 | Powers et al. | |
| 2016/0266269 A1 | 9/2016 | Wilson et al. | |
| 2016/0349405 A1 | 12/2016 | San Martin et al. | |
| 2017/0075023 A1 | 3/2017 | Fouda et al. | |
| 2017/0082770 A1 | 3/2017 | Mandviwala et al. | |
| 2017/0123096 A1 | 5/2017 | Wilson et al. | |
| 2017/0248728 A1 | 8/2017 | Fouda et al. | |
| 2017/0248730 A1 | 8/2017 | San Martin et al. | |
| 2017/0254917 A1 | 9/2017 | Fouda et al. | |
| 2017/0269253 A1 | 9/2017 | Fouda et al. | |
| 2017/0275985 A1 | 9/2017 | Fouda et al. | |
| 2018/0003850 A1 | 1/2018 | Jaaskelainen et al. | |
| 2018/0066509 A1 | 3/2018 | Fouda et al. | |
| 2018/0106763 A1 | 4/2018 | Fouda et al. | |
| 2018/0106764 A1 | 4/2018 | Fouda et al. | |
| 2018/0135405 A1 | 5/2018 | Fouda et al. | |
| 2018/0143344 A1 | 5/2018 | Dai et al. | |
| 2018/0172872 A1 | 6/2018 | Fouda et al. | |
| 2018/0209265 A1 | 7/2018 | Fouda et al. | |
| 2018/0223648 A1 | 8/2018 | Wilson et al. | |
| 2018/0306023 A1 | 10/2018 | San Martin et al. | |
| 2018/0313207 A1 | 11/2018 | Khalaj Amineh et al. | |
| 2018/0347353 A1 | 12/2018 | Wang et al. | |
| 2019/0003815 A1 | 1/2019 | San Martin et al. | |
| 2019/0063213 A1 | 2/2019 | Donderici et al. | |
| 2019/0078430 A1 | 3/2019 | Fouda et al. | |
| 2019/0196039 A1 | 6/2019 | Wilson et al. | |
| 2019/0218904 A1 | 7/2019 | Fouda et al. | |
| 2019/0277995 A1 | 9/2019 | Fouda et al. | |
| 2019/0339230 A1 | 11/2019 | Khalaj Amineh et al. | |
| 2019/0369285 A1 | 12/2019 | Fouda et al. | |
| 2019/0383135 A1 | 12/2019 | Hill, III | |
| 2019/0390544 A1 | 12/2019 | Dai et al. | |
| 2020/0003929 A1 | 1/2020 | Wilson et al. | |
| 2020/0081148 A1 | 3/2020 | Capoglu et al. | |
| 2020/0103374 A1 | 4/2020 | Guner et al. | |
| 2020/0109974 A1 | 4/2020 | Hill, III et al. | |
| 2020/0182830 A1 | 6/2020 | Fouda et al. | |
| 2020/0190969 A1 | 6/2020 | Ren et al. | |
| 2020/0200940 A1 | 6/2020 | Fouda et al. | |
| 2020/0209425 A1 | 7/2020 | Ewe et al. | |
| 2020/0217982 A1 | 7/2020 | San Martin et al. | |
| 2020/0257014 A1 | 8/2020 | Khalaj Amineh et al. | |
| 2020/0271817 A1 | 8/2020 | Ewe et al. | |
| 2020/0271818 A1 | 8/2020 | Fouda et al. | |
| 2020/0284141 A1 | 9/2020 | San Martin et al. | |
| 2020/0309986 A1 | 10/2020 | Donderici et al. | |
| 2020/0319362 A1 | 10/2020 | Guner et al. | |
| 2020/0333500 A1 | 10/2020 | Fouda et al. | |
| 2020/0378240 A1 | 12/2020 | Fouda et al. | |
| 2021/0054731 A1 | 2/2021 | Fouda et al. | |
| 2021/0080610 A1 | 3/2021 | Fouda et al. | |
| 2021/0088686 A1 | 3/2021 | Samson et al. | |
| 2021/0198998 A1 | 7/2021 | Donderici et al. | |
| 2021/0208103 A1 | 7/2021 | Hill, III et al. | |
| 2021/0108507 A1 | 8/2021 | Hill, III et al. | |
| 2021/0239874 A1 | 8/2021 | Fouda | |
| 2021/0256671 A1 | 8/2021 | Guner et al. | |
| 2021/0304386 A1 | 9/2021 | Guner et al. | |
| 2021/0355812 A1 | 11/2021 | Fouda et al. | |

OTHER PUBLICATIONS

Schlumberger, EM Pipe Scanner, Electromagnetic Casing Inspection Tool, 2009.

Gowell, MTD, 2022. Accessed Jan. 2022, Available at https://www.gowellpetro.com/well-integrity-analysis.

TGT, Pulse, Accessed Jan. 2022, Available at https://tgtdiagnostics.com/systems/tgt-pulse-1/.

Innospection, Boenisch, Inspection Approaches & Experience for Inspecting Challenging Subsea Assets. 2015.

* cited by examiner

DOWNHOLE TUBULAR INSPECTION COMBINING PARTIAL SATURATION AND REMOTE FIELD EDDY CURRENTS

CROSS-REFERENCE TO RELATED APPLICATIONS

The present application is a non-provisional of U.S. Patent Application No. 63/208,053, filed on Jun. 8, 2021, the entire disclosure of which is incorporated herein by reference.

BACKGROUND

A variety of tubular equipment is used in constructing and operating hydrocarbon recovery wells. A well is typically drilled with a rotary drill bit, giving the wellbore a generally circular profile. The well may then be completed for production using various tubular members (i.e., tubulars). Long strings of tubulars, known as tubing strings or tubular strings, may be constructed by coupling individual tubing segments end to end. For example, portions of the wellbore may be reinforced with a tubular metallic casing. Multiple sections of casing may also be installed of progressively narrower diameter. Liners and production tubing are other types of tubular metallic equipment installed downhole.

Many types of tubulars used in well construction remain downhole for the life of the well. Proactive surveillance of downhole tubulars is therefore important to ensure equipment availability, uninterrupted operation, reduced maintenance cost, and minimal nonproductive time. Early detection of metal loss is of great importance to oil and gas wells management. Failure to detect tubular flaws, such as cracks, pitting, holes, and any metal loss due to corrosion, may require expensive remedial actions and shut down of production wells. A number of tool types have therefore been developed for inspection of downhole tubulars.

Inspecting downhole tubulars is more complicated when there are multiple, nested tubulars, such as an outer casing, an inner casing, a conductive casing, a liner, a production tubing, and so forth. Some tools, like mechanical calipers and video-imaging tools, can only examine the inner surface of the first (innermost) tubing string. Ultrasonic tools can inspect both inner and outer surfaces for the first string. However, any dirt or debris may show up as anomalous features or artifacts in the data. This means that ultrasonic inspection may not be used for some wellbore environments where tubulars cannot be cleaned, for example those with a small inner diameter. Magnetic flux leakage tools can also inspect both inner and outer surfaces of the first string. However, magnetic flux leakage tools need to magnetize the test component to a very high level, which is not achievable for certain types of tubulars made of non-ferromagnetic materials. Finally, remote field eddy current (RFEC) tools use low-frequency signals to detect anomalies on multiple nested tubulars, not just the first string. However, the low-frequency signals of RFEC sensors provides relatively low vertical resolution and no azimuthal discrimination.

BRIEF DESCRIPTION OF THE DRAWINGS

These drawings illustrate certain aspects of some of the embodiments of the present disclosure and should not be used to limit or define the method.

DETAILED DESCRIPTION

Tools and methods for inspecting downhole tubulars are disclosed that combine the multi-tubular inspection capabilities of RFEC sensors with high-resolution partial saturation eddy current (PSEC) sensors. Ferromagnetic tubulars have high relative permeability, so the penetration depth of eddy currents induced by RFEC sensors may be limited to a few tenths of a millimeter. At this depth, conventional eddy-current methods cannot detect anomalies on the outer pipe surface. PSEC sensors provide higher-resolution capabilities along with directional (azimuthal) discrimination. This enables the tool to detect small features on the first tubular, such as cracks, pitting and holes.

With the inclusion of both RFEC and PSEC sensors, the disclosed tools and methods are capable of selectively obtaining tubular parameters of an inner tubular and/or one or more outer tubular. As used herein, the term "tubular parameters" includes parameters of a selected (inner or outer) tubular, including but not limited to a pipe thickness, a percentage metal loss or gain, a magnetic permeability, an electrical conductivity, an eccentricity, and an inner diameter (ID) or outer diameter (OD). The term "electromagnetic material properties" as used herein comprises a subset of tubular parameters that relate to electromagnetivity, including but not limited to magnetic permeability and electrical conductivity.

In one example, an electromagnetic tubular inspection tool according to the disclosure includes at least two sensor sections—a first, PSEC-based sensor section operating at a relatively high-frequency range (e.g., 10 kHz-150 kHz) and a second, RFEC-based sensor section operating at a relatively low-frequency range (e.g., 0.1 to 500 Hz). The PSEC sensor section includes one or more high resolution PSEC modules, with sensors operating at a higher frequency range than the RFEC sensor section, to characterize defects on the inner pipes only. The PSEC sensor module may include a magnetizer unit to generate a constant magnetic field to reduce a permeability of the inner tubular being inspected using the PSEC sensors. The PSEC sensors are responsive to changes in an induced eddy current corresponding to a tubing wall variation of the downhole tubular. If the cross section of the tubing wall is reduced by a defect, for example, compression of the field lines occurs, thus increasing the field strength in this area. This local increase of the field strength can be detected by the PSEC sensors, as the signal amplitude is related to the defect volume. The magnetizer unit superimposes a magnetic field on the ferromagnetic pipe to reduce the pipe permeability, which increases the penetration depth of the eddy current. Therefore, the high-resolution module of the PSEC sensor section can inspect the inner and outer surfaces of the first pipe. Processing these responses leads to high resolution (up to several millimeters) in characterization of inner pipes. This method is well suited to detect pitting corrosion and local defects in tubes made from ferromagnetic material.

The lower-frequency, RFEC sensor section is designed based on the remote field eddy current principle, which can characterize the defects on both inner pipes and outer pipes. However, processing low-frequency responses leads to lower resolution in characterization of the pipes. Thus, this disclosure provides, in part, a new electromagnetic tool that combines high-resolution PSEC sensors arranged on sensor pads and multi-spacing low-frequency RFEC sensors.

A synergy is achieved by obtaining both RFEC and PSEC measurement data and analyzing that data together to provide a more comprehensive analysis than just the separate RFEC and PSEC measurements would provide. For example, the PSEC-based measurements regarding the inner tubular can provide certain assumptions or constraints in the analysis of RFEC-based measurements for the other nested tubulars, to improve the interpretation of outer tubular parameters from the RFEC sensors. The disclosed joint processing of multi-spacing measurements from RFEC sensors and high-resolution measurements from PSEC sensors enables the evaluation of multiple nested tubulars with higher accuracy. Overall, this can provide much more detail for the inner tubular than a conventional RFEC based tool and it also refines the estimation for outer tubulars.

In an example tool and method, a low-frequency sensor module comprising an RFEC-based sensor transmitter/receiver section can estimate individual parameters of the nested tubulars, such as the individual thickness, percentage metal loss or gain, magnetic permeability, and electrical conductivity, eccentricity, inner diameter (ID) of each tubular. The RFEC-based sensor(s) may also estimate aggregate parameters of the nested tubulars, such as a total thickness of all the tubulars. A high-frequency sensor modules comprising one or more high-frequency PSEC-based sensor can additionally estimate one or more parameters of the innermost tubular, such as magnetic permeability and electrical conductivity, ID, and wall thickness at any given depth, and with high resolution. The high-resolution parameter(s) obtained by the PSEC sensors may be used to constrain the inversion of the low-frequency RFEC measurements to solve for parameters of outer tubulars.

Any of a variety of mechanical configurations are possible, including but not limited to the examples provided below and in the figures. In some configurations, the PSEC sensor(s) may be disposed in one or more sensor pad. The sensor pad(s) are optionally mounted on radially-extendable arms for the desired proximity to the inner tubular. The PSEC sensor are also directional and can relate measurements to a particular azimuth. A gyroscope or accelerometer may also be used to provide angle measurements. The low-frequency RFEC logs may be used to estimate the eccentricity ratio of the innermost tubular with respect to surrounding tubular. The logs of eccentricity ratio and eccentricity azimuth angle may be used to construct a three-dimensional (3D) mapping of the tubulars' trajectory, which is useful, for example, in detecting tubular buckling.

Figure 1:
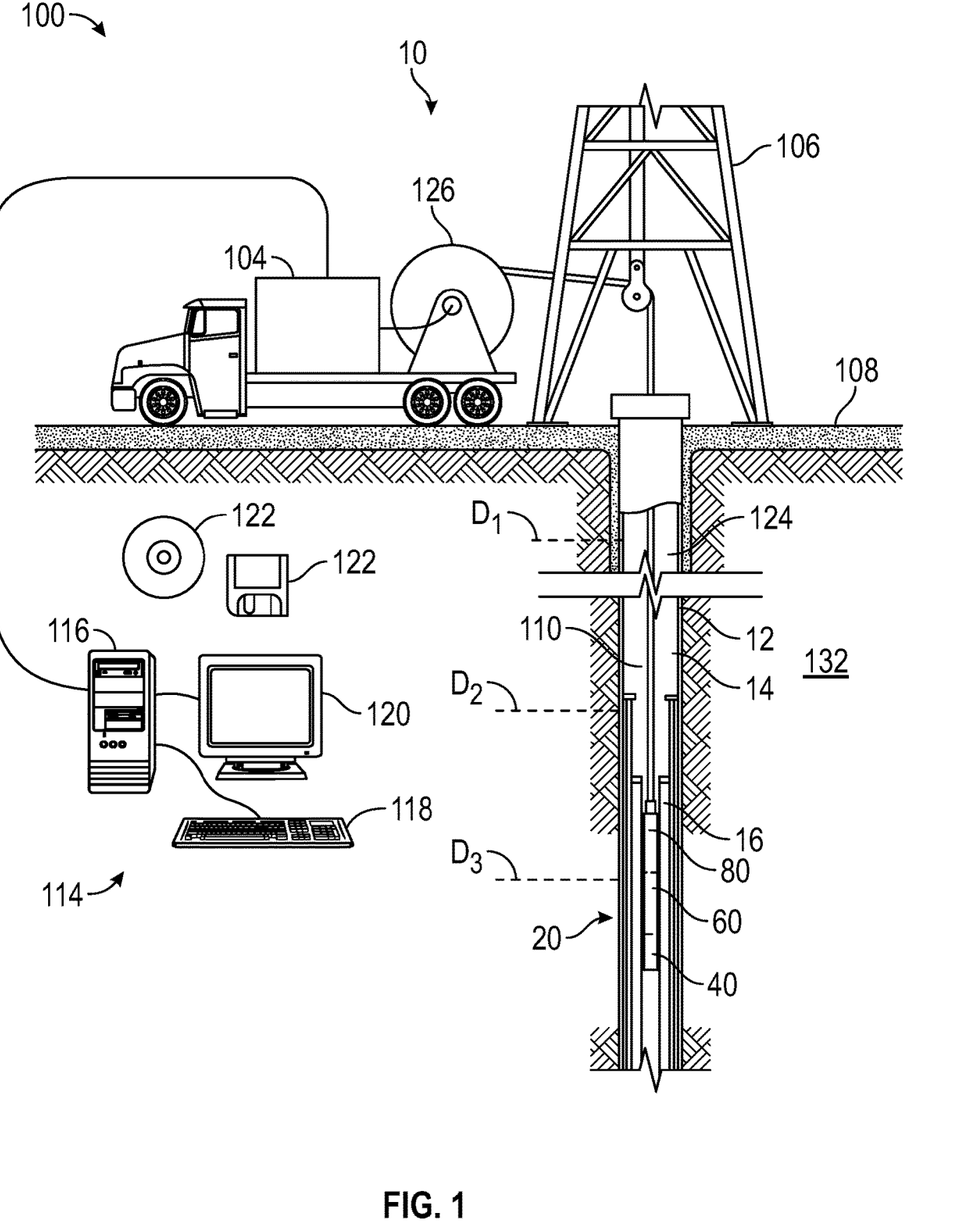
FIG. 1 is a schematic, elevation view of a downhole tubular inspection system implemented at an example well site.

FIG. 1 is a schematic, elevation view of a downhole tubular inspection system 100 implemented at an example well site 10. While FIG. 1 generally depicts a land-based well site 10, those skilled in the art will recognize that the principles described herein are equally applicable to other well sites, such as offshore operations that employ floating or sea-based platforms and rigs, without departing from the scope of the disclosure. The well site 10, system 100, and their various components are conceptually and schematically depicted in FIG. 1 and are generally not to scale. A wellbore 124 extends from a surface 108 of the well site 10 down to a hydrocarbon-bearing formation 132. For ease of illustration, the wellbore 124 is shown extending vertically. However, the wellbore 124 may follow any given wellbore path through the formation 132, particularly with the use of directional drilling techniques, and may therefore include horizontal and/or deviated sections (not shown).

The well may include any number of tubulars of any type for inspection by the disclosed tools and methods. FIG. 1 illustrates, by way of example, a first tubular 12, a second tubular 14, and a third tubular 16. The tubulars 12, 14, 16 may be any ferromagnetic tubulars for inspection. The first tubular 12 may be, for example, a casing string cemented in place to reinforce the wellbore 124. The second tubular 14 may be, for example, a conductor casing disposed interior to the casing 12 having an upper end disposed below the upper end of the casing 12. A third tubular 16 may be, for example, a production tubing string disposed interior to the second tubular 14, with an upper end below the upper end of the second tubular 14. The overlapping tubulars provide examples of nested tubular arrangements at different depths. At a depth D1, there is just the single tubular 12. At a depth D2, the first and second tubulars 12, 14 are axially overlapping, with the second tubular 14 being the innermost tubular at depth D2. At a depth D3, all three tubulars 12, 14, 16 are overlapping, with the third tubular 16 being the innermost tubular at depth D3.

The system 100 includes a downhole tubular inspection tool 20 lowered into a wellbore 124 on a conveyance 110 for inspecting one or more of the tubulars 12, 14, 16. In this example, the conveyance 110 is depicted as a wireline delivered from a reel 126 of a wireline vehicle 104 and supported by a rig 106. However, the conveyance 110 may alternately be any suitable conveyance for downhole tubular inspection tool 20, including, but not limited to, wireline, slickline, coiled tubing, pipe, drill pipe, drill string, or downhole tractor. In some examples, the downhole tubular inspection tool 20 can be run in memory on slickline operations, including but not limited to digital slickline. The conveyance 110 may provide mechanical suspension, electrical and/or optical connectivity for power and signal communication, and in some cases fluid communication, for the downhole tubular inspection tool 20.

The downhole tubular inspection tool 20 may be organized functionally and/or spatially in multiple sensor sections having sensors of corresponding type. The sensor sections schematically depicted in FIG. 1 include a lower-frequency RFEC section 40, a higher-frequency PSEC section 60, and a directional sensor section 80. Each of these sections may represent different assemblies or sub-assemblies of components. The different sections may use different types of sensors and other components to obtain different sets of measurement data downhole corresponding to the nested tubulars 12, 14, 16. Although the downhole tubular inspection tool 20 may be used for inspecting even a single tubular, the downhole tubular inspection tool 20 has capabilities discussed herein for examining the individual and combined properties of the multiple nested tubulars 12, 14, 16 in FIG. 1. The individual sections 40, 60, 80 use different sensor types to obtain different sets of measurement data about one or more of the tubulars. The data from each section may be useful to assess the tubulars. The data from the different sections may further be aggregated, correlated, compared, analyzed, or otherwise processed to give a more comprehensive assessment of the tubulars 12, 14, 16 beyond just the measurements of the individual sections.

The RFEC section 40 may include one or more electromagnetic (e.g. "exciter") coils to generate a relatively low-frequency magnetic field. For example, a low-frequency transmitter/receiver system in the RFEC section 40 may operate in a frequency range of 0.1-500 Hz. The low-frequency magnetic field, in turn, generates eddy currents within the nested tubulars 12, 14, 16. These eddy currents can be received and interpreted to obtain parameters of the tubulars, such as the individual thickness, percentage metal loss or gain, magnetic permeability, and electrical conductivity, eccentricity, inner diameter (ID) of each tubular. The RFEC-based sensor may also estimate aggregate parameters of the nested tubulars, such as a total thickness of all the tubulars. These sensors and measurements are generally omnidirectional, i.e., not specific to a particular azimuth within the tubular(s).

The PSEC section 60 may include a magnetizer unit and one or more high-frequency PSEC-based sensor. The PSEC section 60 may operate in a frequency range of 10 kHz-150 kHz, for example. The PSEC section 60 estimates one or more parameters of the innermost tubular (tubular 16 in this example). These parameters may include magnetic permeability, electrical conductivity, ID, and wall thickness at any given depth. The PSEC sensors are capable of detecting internal and external defects. The PSEC sensors may also rely on variations in magnetic flux density that are detected using eddy current sensors, except the signals are higher-frequency and the readings obtained are generally directional (azimuth) and higher-resolution. The magnetizer generates a constant magnetic field to reduce permeability and increase resolution.

The directional sensor section 80 may include a gyroscope, accelerometer, or magnetometer capable of sensing angle within the wellbore 14, such as the angle of a deviated section relative to vertical or an azimuth about vertical. This may comprise a triaxial gyroscope or accelerometer to measure tool tilt angle.

The RFEC section 40, PSEC section 60, and directional sensor section 80 may be on one or more separate tool bodies, and still be considered as part of the same tool for the purpose of this disclosure. Their collective measurements may still be analyzed as a combined data set by the information handling system 114. Although the various sensor sections 40, 60, 80 may be spaced as closely as practicable, physical and/or electrical constraints might require these sections 40, 60, 80 to have at least some axial separation from each other. Although each section is at a different depth in the wellbore 124 at any given instant during measurements, the depth information associated with their respective measurements as a function of depth may be recorded so that measurements at a given depth may be compared or related.

Information from the downhole tubular inspection tool 20 including from the RFEC section 40, PSEC section 60, and directional sensor section 80 may be gathered and/or processed by information handling system 114. For example, signals recorded by downhole tubular inspection tool 20 may be stored on memory and then processed by downhole tubular inspection tool 20. The processing may be performed real-time during data acquisition or after recovery of downhole tubular inspection tool 20. Processing may alternatively occur downhole or may occur both downhole and at surface. In some examples, signals recorded by downhole tubular inspection tool 20 may be conducted to information handling system 114 by way of the conveyance 110. Information handling system 114 may process the signals, and the information contained therein may be displayed for an operator to observe and stored for future processing and reference. Information handling system 114 may also contain an apparatus for supplying control signals and power to downhole tubular inspection tool 20.

Systems and methods of the present disclosure may be implemented, at least in part, with information handling system 114. While shown at surface 108, information handling system 114 may also be located at another location, such as remote from wellbore 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The downhole tubular inspection tool 20 may be connected to and/or controlled by information handling system 114, which may be disposed on surface 108. Without limitation, information handling system 114 may be disposed down hole in downhole tubular inspection tool 20. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tubular inspection tool 20 may be brought to surface 108. In examples, information handling system 114 may communicate with downhole tubular inspection tool 20 through a fiber optic cable (not illustrated) disposed in (or on) the conveyance 110. In examples, wireless communication may be used to transmit information back and forth between information handling system 114 and downhole tubular inspection tool 20. Information handling system 114 may transmit information to downhole tubular inspection tool 20 and may receive as well as process information recorded by downhole tubular inspection tool 20. In examples, a downhole information handling system (not illustrated) may include, without limitation, a microprocessor or other suitable circuitry, for estimating, receiving and processing signals from downhole tubular inspection tool 20. Downhole information handling system (not illustrated) may further include additional components, such as memory, input/output devices, interfaces, and the like. In examples, while not illustrated, downhole tubular inspection tool 20 may include one or more additional components, such as analog-to-digital converter, filter and amplifier, among others, that may be used to process the measurements of downhole tubular inspection tool 20 before they may be transmitted to surface 108. Alternatively, raw measurements from downhole tubular inspection tool 20 may be transmitted to surface 108.

Any suitable technique may be used for transmitting signals from downhole tubular inspection tool 20 to surface 108. As illustrated, a communication link (which may be wired or wireless and may be disposed in the conveyance 110, for example) may be provided that may transmit data from downhole tubular inspection tool 20 to an information handling system 114 at surface 108.

Figure 2:
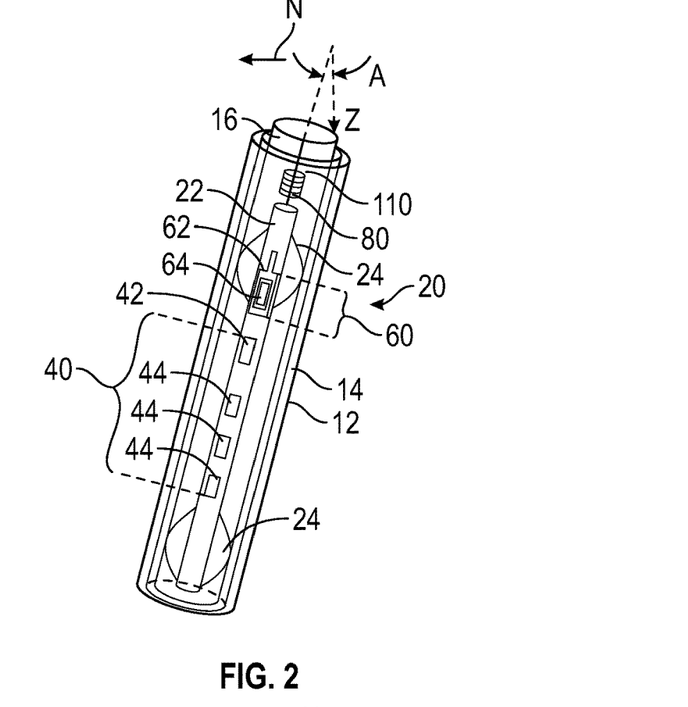
FIG. 2 is a perspective view of the downhole tool suspended from a wireline in the innermost tubular of three nested tubulars.

FIG. 2 is a perspective view of the downhole tubular inspection tool 20 suspended from a wireline 110 in the innermost tubular 16 of the nested tubulars 12, 14, 16 according to one example configuration. The downhole tubular inspection tool 20 includes a tool body 22, which may comprise a mandrel. The tool body 22 may structurally support components thereon, and internally house electronics, wiring, or other sensitive components to protect them from the downhole environment. One or more centralizers 24 are optionally included on the tool body 22 which may protect the downhole tubular inspection tool 20, by spacing from the ID of the inner tubular 16, and may also centralize the downhole tubular inspection tool 20 within the inner tubular 16 such as to promote uniform measurements. The centralizers 24 may be formed of a nonferromagnetic material to minimize interference with sensor measurements. The tool 20 and surrounding tubulars are illustrated as being in a deviated section that is at an angle "A" with respect to vertical represented by a "Z" axis. The angle of the tool 20 and tubulars may have an associated azimuth about the Z axis, such as with respect to a fixed reference frame such as magnetic north "N."

The RFEC section 40 in this example includes one RFEC transmitter 42 and three RFEC receivers 44 axially spaced along the tool body 22. However, in another configuration, a low-frequency RFEC receiver may be situated at essentially the same axial position along the tool mandrel as the transmitter. The RFEC transmitter 42 and sensors 44 may be directly coupled to the tool body 22 and are not required to be moveable. The RFEC transmitter 42 generates an omnidirectional electromagnetic signal at a lower frequency spectrum that induces eddy currents in the tubular 16. A low-frequency transmitter may be excited by either a continuous-wave current (frequency-domain excitation), or a pulsed current (time-domain excitation). The eddy currents are then received by the RFEC receivers 44 and the signals may be processed by the information handling system 114 to determine one or more parameters of the tubular 16 as well as other nested tubulars, and also to analyze the RFEC information with information obtained by other sensors.

The PSEC section 60 includes one or more PSEC sensor module. The PSEC sensor module may include one or more PSEC sensor 64 mounted on one or more sensor pad 62 and a magnetizer unit for generating a magnetic field to reduce permeability. The magnetizer unit (not explicitly shown) may be included in the tool body, mounted in the sensor pad 62, or both. Mounting it in the sensor pad may get closer to the tubular being inspected. Generally, a sensor pad according to this disclosure provides a mounting location for a sensor. A sensor pad may comprise a shape, structure, geometry, and/or materials that are beneficial as a mounting location for sensors. For example, a sensor pad may provide wear resistance and/or a structure that can withstand being lowered through long stretches of a wellbore, and which may help protect the sensors. A sensor pad may also position the sensors near an outermost location of the tool 20. In some configurations, the sensor pad 62 could be mounted in a fixed position to the tool body 22. In this example, however, the sensor pad 62 is in a retracted position in FIG. 2 close to the tool body 22, which may help protect the sensor pad 62 while tripping into the well. The sensor pad 62 may be radially extended to get closer to the ID of the inner tubular 16. The presence of defects in the tubular 16 causes variations in magnetic flux density that are detected using eddy current sensors on the sensor pad 62. The PSEC sensor 64 thereby obtains high-resolution information about the inner tubular 16.

The directional sensor section 80 may be spaced apart from the PSEC section 60 and RFEC section 40, either as a separate mechanism on the same tool body 22 or a separate module supported in a tool string above or below the PSEC section 60 and RFEC section 40.

Figure 3:
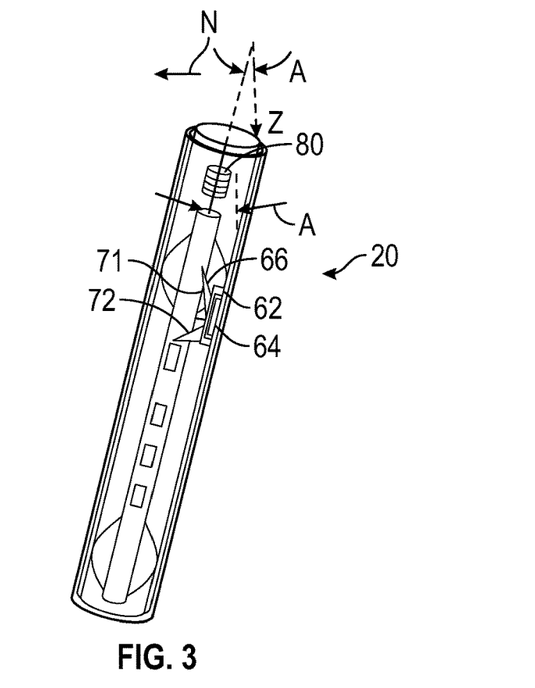
FIG. 3 is a perspective view of the tool with the pad radially extended on arms to a small offset from the tubing wall of the innermost tubular.

FIG. 3 is a perspective view of the downhole tubular inspection tool 20 with the sensor pad 62 radially extended on one or more extendible arms 71 and/or 72 to a small offset from the tubing wall of the innermost tubular 16. Moving the PSEC sensor 64 as close as practicable to the inner wall may help provide accurate assessments for both inner and outer surfaces of the first tubular 16 with high resolution. The extendible arms may include an upper arm 71 upwardly extending from the pad 62 to facilitate uplogging (logging while raising the tool within the inner tubular) and a lower arm 72 extending downwardly from the pad 62 to facilitate downlogging (logging while lowering the tool within the inner tubular).

The directional sensor section 80 is used to obtain directional information, such as dip angle relative to vertical (Z-axis) and azimuth about vertical. The directional information may be with reference to vertical, such as with a simplified dip angle "A" obtained from vertical as indicated in FIG. 3. The azimuth may be defined with respect to a fixed reference frame such as magnetic north N. The directional sensor section 80 may comprise, for example, a gyroscope or accelerometer used to determine such directional measurements.

Generally, a method for mapping the trajectory of a well tubular or set of nested well tubulars may comprise logging a well with a tool equipped with multiple PSEC (high-frequency) sensor pads to provide directional sensitivity, one or more RFEC (low-frequency) sensor, and a gyroscope or accelerometer information to put measurements on angle. One or more log may be obtained of omni-directional low-frequency measurements using RFEC. One or more logs may also be obtained of directional high-frequency measurements using PSEC. The low-frequency logs may be processed using inversion to estimate an eccentricity ratio of the innermost tubular with respect to the surrounding tubular. The high-frequency directional log(s) may be processed to estimate an eccentricity azimuth angle by comparing variations in sensor pad response signals at a given depth with a baseline signal. Logs of eccentricity ratio and eccentricity azimuth angle may be combined to construct a 3D mapping of the tubulars' trajectories. Additionally, a triaxial gyroscope or accelerometer may be used to measure tool tilt angle, and the tilt angle of the tool is used to map the trajectory of the innermost tubular. In the case of nested tubulars, sensor data analyzed for the first (innermost) tubular may be used as baseline data to correct the 3D mapping of tubular trajectories involving other tubulars, such as to obtain a more accurate mapping of the trajectory of the second tubular. The trajectory maps may then be used to detect buckling or other non-linearity in the tubulars.

FIGS. 4-7 are a sequence of diagrams outlining an analytic framework of how the foregoing method may be implemented with a tool such as described in FIGS. 1-3 to inspect multiple nested tubulars downhole. The method and tool may combine RFEC, PSEC, and directional information to obtain information about a first tubular (e.g., production tubing) and a second tubular (e.g., casing) in which the first tubular is disposed.

Figure 4:
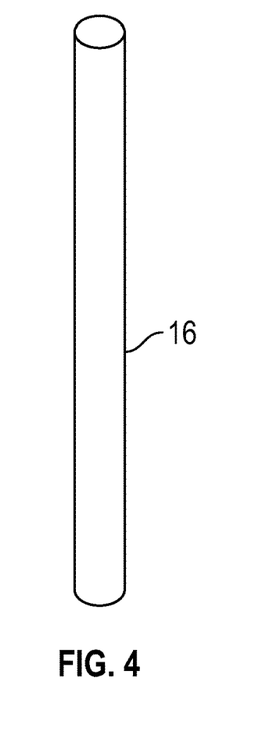
FIG. 4 is a schematic representation of a standard tubing assumption.

FIG. 4 is a schematic diagram representing a simplified tubing assumption sometimes used in conventional tubing inspection and analysis. The simplified tubing assumption is that the downhole tubular 16 being inspected is perfectly straight and circular in cross-section. Sensor measurements based on this simplified tubing assumption may neglect to account for the possibility of bent, uneven, or eccentric tubing, for example, which can give an incomplete perspective on the condition of the downhole tubular 16 and affect the accuracy of measurements or decisions based on measurements. Even if useful information about the inner surface of the tubing wall is obtained, the failure to diagnose or assess the non-linearity or other deviation from the simplified tubing assumption of the inspected tubular 16 can limit the analysis. This assumption of straight tubing for the innermost tubular may be corrected to obtain a profile of the tubing corrected with directional information.

Figure 5:
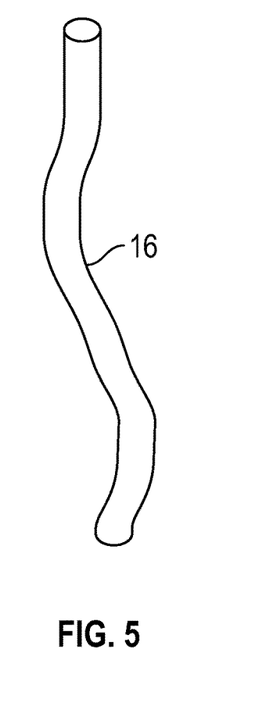
FIG. 5 is a schematic representation of a tubing position corrected with directional information.

FIG. 5 is a schematic diagram wherein the simplified assumption of straight tubing (FIG. 4) for the downhole tubular 16 (e.g., the innermost tubular) has been corrected with directional information. For example, a triaxial gyroscope or accelerometer may be used to measure tool tilt angle and azimuth. The directional information may then be used to map the trajectory of the innermost tubular.

Figure 6:
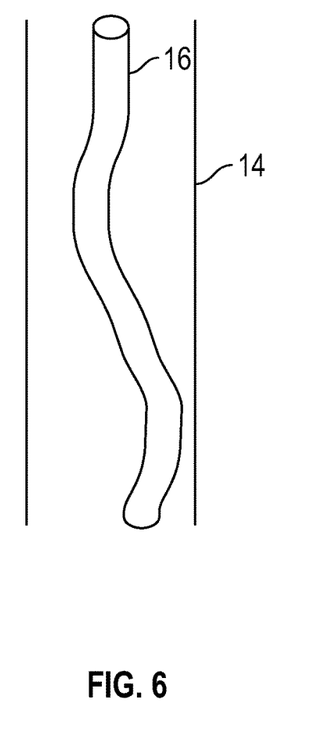
FIG. 6 is a schematic representation of an outer tubular assumption.

FIG. 6 is a schematic diagram wherein the corrected profile of the innermost tubular 16 per FIG. 5 is juxtaposed with a simplified assumption of straight outer tubular 14 (e.g., casing around production tubing). Again, this simplified assumption lacks certain detail in characterizing the nested downhole tubulars that could limit a complete analysis and course of action. Therefore, the tool and method may be used to obtain a more comprehensive assessment of the downhole tubulars.

Figure 7:
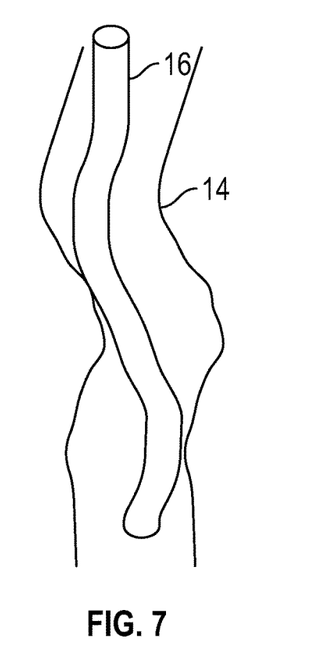
FIG. 7 is a schematic representation of the corrected tubing position of FIG. 4 disposed in a corrected casing position.

FIG. 7 is a schematic diagram wherein the assumption of a straight outer tubular 14 has been corrected to obtain a corrected outer tubing profile. Baseline data for the first (innermost) tubular 16 may be used to correct the 3D mapping of tubular trajectories involving the second tubular, such as to obtain a more accurate mapping of the trajectory of the second tubular. The low-frequency logs may be processed using inversion to estimate an eccentricity ratio of the innermost tubular with respect to the surrounding tubular. The high-frequency directional log(s) may be processed to estimate an eccentricity azimuth angle by comparing variations in sensor pad response signals at a given depth with a baseline signal. Logs of eccentricity ratio and eccentricity azimuth angle may be combined to construct a 3D mapping of the tubulars' trajectories.

Applying the foregoing features and principles, downhole tubulars may be inspected in any of a variety of methods. The methods may rely on both high-frequency (e.g., PSEC sensors) and low-frequency (e.g., RFEC) transmitters/receivers to assess electromagnetic properties of the tubulars. For example, the PSEC sensors may be better suited to obtain properties of the inner tubular, whereas the RFEC sensors may be better suited to obtain properties of the outer tubular(s). The logs obtained by both RFEC and PSEC sensors may be analyzed together to obtain additional properties not obtainable by either section separately. The following are some non-limiting example methods.

In one example method, a logging tool is conveyed through a plurality of downhole tubulars. The downhole tubulars may include an inner tubular and one or more outer tubulars disposed around the inner tubular. A low-frequency transmitter and receiver may be operated within a first (e.g., low-frequency) frequency range to log low-frequency measurements of the one or more outer tubulars. A high-frequency sensor module may be operated within a second (e.g., high-frequency) frequency range that is greater than the first frequency range to log high-frequency measurements of at least the inner tubular. The low-frequency measurements may be inverted to estimate tubular parameters of one or more of the downhole tubulars. The inversion is based in part on the high-frequency measurements logged by the high-frequency sensor. The inversion may include inverting the low-frequency measurements to estimate tubular parameters such as a thickness, a percentage metal loss or gain, a magnetic permeability, an electrical conductivity, an eccentricity, or an inner diameter (ID) of one or more of the downhole tubulars. The high-frequency log may be processed to estimate one or more parameters of the inner pipe comprising a magnetic permeability, an electrical conductivity, an ID, and a wall thickness at any given depth. Those parameters may then be used to constrain the inversion of the low-frequency measurements to solve for parameters of the one or more outer pipes. Electromagnetic properties of the outer tubulars may be set equal to materials properties of the inner tubular, in cases where the outer tubulars and inner tubular are made of the same or similar materials.

In some cases, the same tubular that is the innermost tubular in a first wellbore zone may be one of the outer tubulars in a second wellbore zone. The logging tool may be moved through the first zone to obtain tubular parameters, which may comprise electromagnetic material properties of that tubular, when that tubular is the innermost tubular. The electromagnetic material properties obtained in the first zone for that tubular may then be set to be the same as, or extrapolated based on those electromagnetic material properties, when in the second zone.

The step of inverting the low-frequency measurements to estimate tubular parameters of one or more of the downhole tubulars may include estimating a magnetic permeability and electrical conductivity of the downhole tubulars and an eccentricity of the inner tubular with respect to one of the outer tubulars. The high-frequency measurements may be processed to estimate a wall thickness and size of anomalies in the inner tubular, wherein this processing is based in part on one of a magnetic permeability, electrical conductivity, and eccentricity estimated from the low-frequency measurements.

In another example method, a logging tool may be conveyed through a plurality of downhole tubulars comprising an inner tubular and one or more outer tubulars disposed around the inner tubular. A low-frequency transmitter and receiver are operated within a first frequency range to log omni-directional low-frequency measurements of the one or more outer tubulars. A high-frequency sensor module may be operated in a second frequency range greater than the first frequency range to obtain a directional log of high-frequency measurements. The high-frequency measurements are taken at least of the inner tubular, using multiple PSEC sensors on sensor pads to provide directional sensitivity and a gyroscope or accelerometer information to put measurements on angle. The low-frequency logs may be processed using inversion to estimate an eccentricity ratio of the inner tubular with respect to one or more of the outer tubulars. The high-frequency directional log may be processed to estimate an eccentricity azimuth angle of the inner tubular with respect to one or more of the outer tubulars by comparing variations in electromagnetic signals at a given depth with a baseline signal obtained from the inner tubular. The logs of eccentricity ratio and eccentricity azimuth angle may be combined to construct a 3D mapping of the trajectories of the downhole tubulars. A tilt angle of the logging tool may be used to map the trajectory of the inner tubular, wherein the logging tool is equipped with one or more centralizers and a triaxial gyroscope or accelerometers to obtain the tool tilt angle. The trajectory of one or more of the outer tubulars may be mapped using the trajectory of the inner tubular to correct the 3D mapping of the trajectory of the one or more outer tubulars. The trajectory maps may then be used to detect buckling in one or more of the downhole tubulars.

Accordingly, the present disclosure provides a variety of systems, tools, and methods for inspecting one or more tubulars, which may be nested, using a combination of sensing technologies, including a unique PSEC sensor section to improve the analysis of RFEC and optional gyroscopic or accelerometer information. The methods, systems, compositions, tools and so forth may include any suitable combination of any of the various features disclosed herein, including but not limited to the following Statements.

Statement 1. A downhole tubular inspection tool, comprising: a tool body configured for lowering into an inner tubular on a conveyance; a low-frequency sensor module including a low-frequency transmitter coil and a low-frequency receiver coil disposed along the tool body, wherein the low-frequency transmitter coil and receiver coil are operable within a first frequency range to measure electromagnetic properties of one or more outer tubulars disposed around the inner tubular; and at least one high-frequency sensor module operable within a second frequency range greater than the first frequency range for measuring electromagnetic properties of the inner tubular.

Statement 2. The downhole tubular inspection tool of Statement 1, wherein the high-frequency sensor module is disposed on a deployable sensor pad coupled to the tool body with one or more extendable arms.

Statement 3. The downhole tubular inspection tool of any of Statements 1 or 2, wherein the low-frequency transmitter is excited by either a continuous-wave current (frequency-domain excitation), or a pulsed current (time-domain excitation).

Statement 4. The downhole tubular inspection tool of any of Statements 1 to 3, wherein the low-frequency receiver is axially spaced along the tool body from the low-frequency transmitter.

Statement 5. The downhole tubular inspection tool of Statement 1 wherein the low-frequency receiver is positioned along the tool body at essentially the same axial position as the low-frequency transmitter.

Statement 6. The downhole tubular inspection tool of any of Statements 1 to 5, wherein the low-frequency transmitter and low-frequency receiver comprise a remote field eddy current (RFEC) transmitter and RFEC receiver operating in a frequency range of 0.1-500 Hz.

Statement 7. The downhole tubular inspection tool of Statement 6, wherein the RFEC receiver comprises a plurality of RFEC receivers axially spaced along the tool body.

Statement 8. The downhole tubular inspection tool of any of Statements 1 to 6, wherein the high-frequency device comprises a partial saturation eddy current (PSEC) sensor operating in a frequency range of 10 kHz-150 kHz.

Statement 9. The downhole tubular inspection tool of Statement 8, wherein the high-frequency device comprises a magnetizer unit for imposing a constant magnetic field for reducing a permeability of the inner tubular while operating the PSEC sensor.

Statement 10. The downhole tubular inspection tool of any of Statements 1 to 9, further comprising one or more non-ferromagnetic tubing centralizers for centering the tool body within the first downhole tubular.

Statement 11. The downhole tubular inspection tool of any of Statements 1 to 10, further comprising: one or more directional sensors coupled to the tool body responsive to a directional orientation of the tool body as it is lowered through the inner tubular.

Statement 12. A method for inspecting nested downhole tubulars, comprising: conveying a logging tool through a plurality of downhole tubulars comprising an inner tubular and one or more outer tubulars disposed around the inner tubular; operating a low-frequency transmitter and receiver within a first frequency range to log low-frequency measurements of the one or more outer tubulars; operating a high-frequency sensor module in a second frequency range of greater than the first frequency range to log high-frequency measurements of at least the inner tubular; and inverting the low-frequency measurements to estimate tubular parameters of one or more of the downhole tubulars, wherein the inversion is based in part on the high-frequency measurements logged by the high-frequency sensor.

Statement 13. The method of Statement 12, wherein inverting the low-frequency measurements to estimate tubular parameters comprises estimating a thickness, a percentage metal loss or gain, a magnetic permeability, an electrical conductivity, an eccentricity, or an inner diameter (ID) of one or more of the downhole tubulars.

Statement 14. The method of Statement 12 or 13, further comprising: processing the high-frequency log to estimate one or more parameters of the inner pipe comprising a magnetic permeability, an electrical conductivity, an ID, and a wall thickness at any given depth, and using those parameters to constrain the inversion of the low-frequency measurements to solve for parameters of the one or more outer pipes.

Statement 15. The method of Statement 14, further comprising setting electromagnetic properties of the outer tubulars equal to electromagnetic materials properties of the inner tubular wherein the outer tubulars and inner tubular are made of the same material.

Statement 16. The method of Statement 15, further comprising: conveying the logging tool through a first zone wherein one of the downhole tubulars is an innermost tubular to obtain electromagnetic material properties of the innermost tubular in the first zone; and conveying the logging tool through a second zone wherein the one of the downhole tubulars is not an innermost tubular and extrapolating its electromagnetic material properties based on its electromagnetic material properties in the first zone.

Statement 17. A method for inspecting nested downhole tubulars, comprising: conveying a logging tool through a plurality of downhole tubulars comprising an inner tubular and one or more outer tubulars disposed around the inner tubular; operating a low-frequency transmitter and receiver within a first frequency range to log low-frequency measurements of the one or more outer tubulars; operating a high-frequency sensor module in a second frequency range of greater than the first frequency range to log high-frequency measurements of at least the inner tubular; inverting the low-frequency measurements to estimate tubular parameters of one or more of the downhole tubulars includes estimating one or both of a magnetic permeability and an electrical conductivity of the downhole tubulars and an eccentricity of the inner tubular with respect to one of the outer tubulars; and processing the high-frequency measurements to estimate a wall thickness and size of anomalies in the inner tubular, wherein this processing is based in part on one of a magnetic permeability, electrical conductivity, and eccentricity estimated from the low-frequency measurements.

Statement 18. A method for inspecting nested downhole tubulars, comprising: conveying a logging tool through a plurality of downhole tubulars comprising an inner tubular and one or more outer tubulars disposed around the inner tubular; operating a low-frequency transmitter and receiver within a first frequency range to log omni-directional low-frequency measurements of the one or more outer tubulars; operating a high-frequency sensor module in a second frequency range of greater than the first frequency range to obtain a directional log of high-frequency measurements of at least the inner tubular, using multiple PSEC sensors on sensor pads to provide directional sensitivity and a gyroscope or accelerometer information to put measurements on angle; processing the low-frequency logs using inversion to estimate an eccentricity ratio of the inner tubular with respect to one or more of the outer tubulars; processing the high-frequency directional log to estimate an eccentricity azimuth angle of the inner tubular with respect to one or more of the outer tubulars by comparing variations in electromagnetic signals at a given depth with a baseline signal obtained from the inner tubular; and combining logs of eccentricity ratio and eccentricity azimuth angle to construct a 3D mapping of the trajectories of the downhole tubulars.

Statement 19. The method of Statement 18, further comprising: using a tilt angle of the logging tool to map the trajectory of the inner tubular, wherein the logging tool is equipped with one or more centralizers and a triaxial gyroscope or accelerometers to obtain the tool tilt angle; and mapping the trajectory of one or more of the outer tubulars using the trajectory of the inner tubular to correct the 3D mapping of the trajectory of the one or more outer tubulars.

Statement 20. The method of Statement 19, further comprising: using the trajectory maps to detect buckling in one or more of the downhole tubulars.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A downhole tubular inspection tool, comprising:
a tool body configured for lowering into an inner tubular on a conveyance;
a low-frequency sensor module including a low-frequency transmitter coil and a low-frequency receiver coil disposed along the tool body, wherein the low-frequency transmitter coil and receiver coil are operable within a first frequency range to measure electromagnetic properties of one or more outer tubulars disposed around the inner tubular; and
at least one high-frequency sensor module operable within a second frequency range greater than the first frequency range for measuring electromagnetic properties of the inner tubular.

2. The downhole tubular inspection tool of claim 1, wherein the high-frequency sensor module is disposed on a deployable sensor pad coupled to the tool body with one or more extendable arms.

3. The downhole tubular inspection tool of claim 1, wherein the low-frequency transmitter is excited by either a continuous-wave current (frequency-domain excitation), or a pulsed current (time-domain excitation).

4. The downhole tubular inspection tool of claim 1 wherein the low-frequency receiver is axially spaced along the tool body from the low-frequency transmitter.

5. The downhole tubular inspection tool of claim 1 wherein the low-frequency receiver is positioned along the tool body at essentially the same axial position as the low-frequency transmitter.

6. The downhole tubular inspection tool of claim 1 wherein the low-frequency transmitter and low-frequency receiver comprise a remote field eddy current (RFEC) transmitter and RFEC receiver operating in a frequency range of 0.1-500 Hz.

7. The downhole tubular inspection tool of claim 6, wherein the RFEC receiver comprises a plurality of RFEC receivers axially spaced along the tool body.

8. The downhole tubular inspection tool of claim 1 wherein the high-frequency device comprises a partial saturation eddy current (PSEC) sensor operating in a frequency range of 10 kHz-150 kHz.

9. The downhole tubular inspection tool of claim 8, wherein the high-frequency device comprises a magnetizer unit for imposing a constant magnetic field for reducing a permeability of the inner tubular while operating the PSEC sensor.

10. The downhole tubular inspection tool of claim 1, further comprising one or more non-ferromagnetic tubing centralizers for centering the tool body within the first downhole tubular.

11. The downhole tubular inspection tool of claim 1, further comprising:
one or more directional sensors coupled to the tool body responsive to a directional orientation of the tool body as it is lowered through the inner tubular.

12. A method for inspecting nested downhole tubulars, comprising:
conveying a logging tool having both a low-frequency transmitter and receiver and a high-frequency sensor module through a plurality of downhole tubulars comprising an inner tubular and one or more outer tubulars disposed around the inner tubular;
operating the low-frequency transmitter and receiver on the logging tool within a first frequency range to log low-frequency measurements of the one or more outer tubulars;
operating the high-frequency sensor module on the logging tool in a second frequency range of greater than the first frequency range to log high-frequency measurements of at least the inner tubular; and
inverting the low-frequency measurements to determine tubular parameters of one or more of the downhole tubulars, wherein the inversion is based in part on the high-frequency measurements logged by the high-frequency sensor.

13. The method of claim 12, wherein inverting the low-frequency measurements to determine tubular parameters comprises determining a thickness, a percentage metal loss or gain, a magnetic permeability, an electrical conductivity, an eccentricity, or an inner diameter (ID) of one or more of the downhole tubulars.

14. The method of claim 12, further comprising:
processing the high-frequency log to determine one or more parameters of the inner pipe comprising a magnetic permeability, an electrical conductivity, an ID, and a wall thickness at any given depth, and using those parameters to constrain the inversion of the low-frequency measurements to solve for parameters of the one or more outer pipes.

15. The method of claim 14, further comprising setting electromagnetic properties of the outer tubulars equal to electromagnetic materials properties of the inner tubular wherein the outer tubulars and inner tubular are made of the same material.

16. The method of claim 15, further comprising:
conveying the logging tool through a first zone wherein one of the downhole tubulars is an innermost tubular to obtain electromagnetic material properties of the innermost tubular in the first zone; and
conveying the logging tool through a second zone wherein the one of the downhole tubulars is not an innermost tubular and extrapolating its electromagnetic material properties based on its electromagnetic material properties in the first zone.

17. A method for inspecting nested downhole tubulars, comprising:
conveying a logging tool having both a low-frequency transmitter and receiver and a high-frequency sensor module through a plurality of downhole tubulars comprising an inner tubular and one or more outer tubulars disposed around the inner tubular;
operating the low-frequency transmitter and receiver within a first frequency range to log low-frequency measurements of the one or more outer tubulars;
operating the high-frequency sensor module in a second frequency range of greater than the first frequency range to log high-frequency measurements of at least the inner tubular;
inverting the low-frequency measurements to determine tubular parameters of one or more of the downhole tubulars includes determining one or both of a magnetic permeability and an electrical conductivity of the downhole tubulars and an eccentricity of the inner tubular with respect to one of the outer tubulars; and
processing the high-frequency measurements to determine a wall thickness and size of anomalies in the inner tubular, wherein this processing is based in part on one of a magnetic permeability, electrical conductivity, and eccentricity determined from the low-frequency measurements.

18. A method for inspecting nested downhole tubulars, comprising:
conveying a logging tool having both a low-frequency transmitter and receiver and a high-frequency sensor module through a plurality of downhole tubulars comprising an inner tubular and one or more outer tubulars disposed around the inner tubular;
operating a low-frequency transmitter and receiver within a first frequency range to log omni-directional low-frequency measurements of the one or more outer tubulars;
operating a high-frequency sensor module in a second frequency range of greater than the first frequency range to obtain a directional log of high-frequency measurements of at least the inner tubular, using multiple partial saturation eddy current (PSEC) sensors on sensor pads to provide directional sensitivity and a gyroscope or accelerometer information to put measurements on angle;
processing the low-frequency logs using inversion to determine an eccentricity ratio of the inner tubular with respect to one or more of the outer tubulars;
processing the high-frequency directional log to determine an eccentricity azimuth angle of the inner tubular with respect to one or more of the outer tubulars by comparing variations in electromagnetic signals at a given depth with a baseline signal obtained from the inner tubular; and
combining logs of eccentricity ratio and eccentricity azimuth angle to construct a 3D mapping of the trajectories of the downhole tubulars.

19. The method of claim 18, further comprising:
using a tilt angle of the logging tool to map the trajectory of the inner tubular, wherein the logging tool is equipped with one or more centralizers and a triaxial gyroscope or accelerometers to obtain the tool tilt angle; and
mapping the trajectory of one or more of the outer tubulars using the trajectory of the inner tubular to correct the 3D mapping of the trajectory of the one or more outer tubulars.

20. The method of claim 19, further comprising:
using the trajectory maps to detect buckling in one or more of the downhole tubulars.

\* \* \* \* \*